Patented Sept. 4, 1934

1,972,465

UNITED STATES PATENT OFFICE 1,972,465

PRODUCTION OF NITRILES

Heinrich Ulrich and Karl Saurwein, Ludwigshafen-on-the-Rhine, Germany, assignors to I. G. Farbenindustrie Aktiengesellschaft, Frankfort-on-the-Main, Germany No Drawing. Application February 6, 1932, Serial No. 591,450. In Germany February 16, 1931

12 Claims. (Cl. 260—99.30)

The present invention relates to the production of nitriles.

It is well known that nitriles of simple alkyl amino caboxylic acids can be obtained by reacting with aldehydes and hydrocyanic acid on primary alkyl amines, open chain aliphatic amines being primarily formed which then add on hydrocyanic acid with the formation of the nitriles.

We have found that nitriles of hydroxyalkyl amino carboxylic acids can be obtained by causing hydrocyanic acid to act on the products obtainable by the reaction of primary or secondary hydroxyalkylamines (alkylolamines containing a hydrogen atom connected to a nitrogen atom) with aliphatic carbonyl compounds, i. e. aliphatic aldehydes and ketones.

The said alkylolamines may be chosen from those corresponding to the general formula

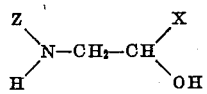

in which Z denotes hydrogen, alkyl, cycloalkyl or aryl radicles, and X denotes hydrogen or an alkyl radicle. Thus, for example, mono-ethanol amine may be employed (in which Z and X are hydrogen) or di-ethanol amine (in which Z is $$-CH_2-CH_2OH$$

and X is hydrogen) as well as mono- or di-$\beta$-hydroxypropyl amines (in which X is $CH_3$). Similar amines are for example N-ethyl-, N-propyl-, N-n-butyl-, N-hexyl-, N-cyclohexyl- or N-phenyl-N-hydroxyethyl amines or the corresponding -N-$\beta$-hydroxypropyl, -N-$\beta$-hydroxybutyl or -N-$\beta$-hydroxyamyl amines as well as N-hydroxyalkyl polyamines, as for example N-aminoalkyl-N-hydroxyalkylamines, such as N-aminoethyl-N-hydroxyethyl amine

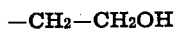

The aliphatic carbonyl compounds may be chosen from formaldehyde, acetaldehyde, propionaldehyde, butyraldehyde and similar aldehydes with longer carbon chains or from aliphatic ketones, such as acetone and its homologues, such as methyl propyl ketone. Generally the reaction proceeds more easily with the lower members of these series and especially with formaldehyde. The products obtained by the action of aldehydes or ketones on the said alkylolamines are oxazolidines

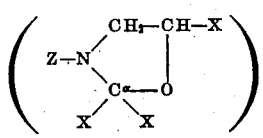

which yield nitriles by treatment with hydrocyanic acid, Z and X corresponding to the above definition thereof in the above formula. The nature of X attached to the $\alpha$-carbon atom will depend on the nature of the carbonyl compound employed the carbonyl oxygen atom of which reacts with a hydrogen atom connected to N and the hydrogen atom of the hydroxyl group of the alkylol group of the original alkylol amine.

The reaction with hydrocyanic acid may be carried out, for example, by bringing the acid into reaction in the gaseous state or by setting it free in any usual manner from its salts, such as alkali metal or alkaline earth metal cyanides, within the reaction mixture by the addition of acids, as for example by leading in carbon dioxide, hydrochloric or sulphuric acids. Thus the most different methods may be applied. For example, liquid or gaseous hydrocyanic acid may be introduced into the product from the interaction of alkylol amine and carbonyl compound, the hydrocyanic acid being prepared, if desired, in a separate vessel from a salt thereof and, for example, sulphuric acid, an isolation of the condensation products obtained from the alkylol amines and aldehydes or ketones being unnecessary, or an aqueous solution of a hydrocyanic salt may be added to the product from the interaction of alkylol amine and carbonyl compound, whereupon hydrochloric or sulphuric acids or carbon dioxide are introduced. On the other hand another suitable sequence of steps may be chosen. Thus, for example, the carbonyl compounds may be first brought into reaction with the hydrocyanic acid to form a cyanhydrin which is then worked with the alkylol amine or the alkylol amine may be first mixed with the hydrocyanic acid, whereupon the carbonyl compound is added. In all cases, preferably equimolecular quantities of the reagents are employed. The reactions may be carried out at temperatures as low as 5° or 10° C. but it is advantageous to employ somewhat higher temperatures such as from about 20° to about 40° C., the reaction being accelerated or finished by warming up to about 100° C., warming to about 50° or 60° C. being sufficient in most cases.

The nitriles thus obtainable are capable of further conversions by reason of the presence of reactive groups, for example they may be reacted with esters of chlorocarboxylic acids, as for example the cetyl ester of chlorocarbonic acid, or with fatty acid chlorides, such as stearic chloride, or they may be converted into carboxylic acids by saponification, for example by heating with caustic alkalies or with soda, or into amines by reduction by means of hydrogen in the presence of hydrogenation catalysts at increased pressure. The amines obtainable in this manner constitute valuable intermediate products for the preparation of pharmaceutical preparations, dyestuffs or artificial materials.

The following examples will further illustrate how this invention may be carried out in practice but the invention is not restricted to these examples. The parts are by weight.

*Example 1*

75 parts of a 40 per cent solution of formaldehyde are added at room temperature to 61 parts of mono-ethanolamine whereby the corresponding oxazolidine is formed. 56.6 parts of 90 per cent sodium cyanide are added to the reaction mixture thus obtained and a stream of gaseous carbon dioxide is then led in at from 40° to 50° C. while shaking until no more carbon dioxide is absorbed. The originally thin liquid becomes viscous during the course of the reaction and when the reaction is completed it constitutes a water-soluble, slightly alkaline viscous liquid. The product obtained is the nitrile of the hydroxyethyl amino acetic acid:

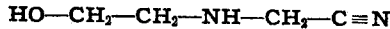

*Example 2*

1 molecular proportion of formaldehyde cyanhydrin (CH₂OH—C≡N) is allowed to drop slowly while cooling at from 20° to 25° C. into 1 molecular proportion of ethanolamine. A product is obtained which is identical with the product obtained according to Example 1.

The same product can be also obtained by dropping 104 parts of aqueous 35 per cent hydrochloric acid into an aqueous solution of 53.3 parts of 92 per cent sodium cyanide cooled to from 5° to 10° C., adding, at from 5° to 10° C., 61 parts of mono-ethanol amine, then slowly introducing, at from 10° to 15° C., 75 parts of a 40 per cent aqueous formaldehyde solution and finally heating for 1 hour to 50° C.

*Example 3*

A mixture of 105 parts of di-ethanol amine with 100 parts of an aqueous 30 per cent solution of formaldehyde is heated to about 50° C. for half an hour. Hydroxyethyloxazolidine is thus formed:

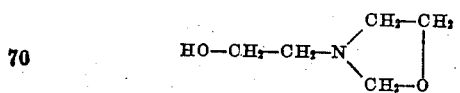

The mixture is cooled to from 10° to 15° C. and 27 parts of anhydrous hydrocyanic acid are then dropped in, and the mixture is heated to about 60° C. for 2 hours, in order to complete the reaction. The water is removed from the nitrile formed by distillation under reduced pressure. The nitrile is a viscous, slightly alkaline, water-soluble liquid, corresponding to the formula:

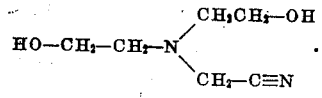

If in the place of the di-ethanol amine 103 parts of mono-ethanol ethylene diamine (NH₂—C₂H₄—NH—C₂H₄OH)

be employed a nitrile is obtained which corresponds to the formula:

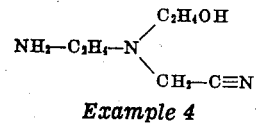

*Example 4*

72 parts of normal butyraldehyde are stirred at a temperature not exceeding 20° C. into a solution of 77 parts of β-hydroxypropylamine in 50 parts of water. β-methyl-δ-(normal propyl) oxazolidine corresponding to the formula:

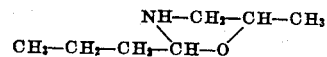

is immediately formed.

A current of hydrocyanic gas prepared by acting with sulphuric acid of 90 per cent strength on 59.6 parts of sodium cyanide, is led, while stirring, into the aqueous suspension of the said hydroxy-azolidine, which is preferably kept at a temperature between 18° and 20° C. After stirring the mixture for an hour at the said temperature, it is heated for a short time to 50° C.

The nitrile of the N-methyl-hydroxyethyl-α-(normal propyl) amino-acetic acid corresponding to the formula:

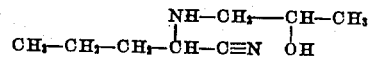

separates as an oil which may be driven off from the aqueous solution. A part of the nitrile which remains dissolved in the water, may be freed therefrom by removing the water by distillation under reduced pressure.

*Example 5*

72 parts of n-butyraldehyde and 40 parts of water are mixed at 30° C. with 137 parts of N-ethanol aniline whereby the oxazolidine corresponding to the formula:

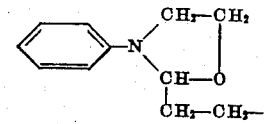

is formed. 27 parts of anhydrous liquid hydrocyanic acid are then introduced, while keeping the temperature below 20° C., whereupon the whole is warmed to 60° C. and kept at this temperature for 1 hour. The water is then removed by distillation in vacuo and a viscous oil is obtained which is the nitrile corresponding to the formula:

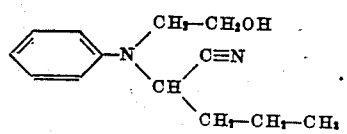

In the place of the ethanol aniline 143 parts of cyclohexyl ethanol amine

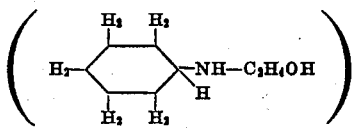

may be employed whereby a nitrile is obtained which corresponds to the formula

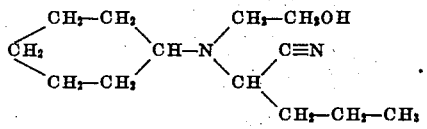

*Example 6*

86 parts of methyl iso-propyl ketone are added at 30° C. to a solution of 75 parts of propanolamine in 40 parts of water, whereby an oxazolidine is obtained which corresponds to the formula:

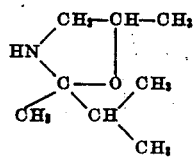

155 parts of an aqueous 32 per cent solution of sodium cyanide are added and, at 55° C. and while shaking after closing the reaction vessel employed, carbon dioxide is introduced until saturation. A viscous solution is obtained which contains the nitrile corresponding to the formula:

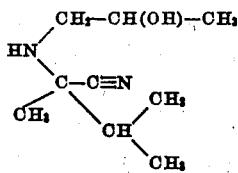

If 86 parts of acetone be employed in the place of the methyl iso-propyl ketone at first an oxazolidine is obtained which corresponds to the formula:

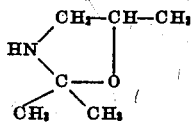

which is converted into a nitrile corresponding to the formula:

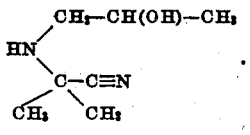

What we claim is:

1. The process for the manufacture of nitriles, which comprises reacting hydrocyanic acid on an oxazolidine corresponding to the formula

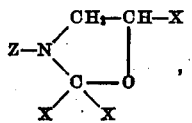

in which Z denotes hydrogen, alkyl, cycloalkyl or aryl radicles and X denotes hydrogen or an alkyl radicle.

2. The process for the manufacture of nitriles, which comprises reacting with a hydrocyanic acid salt on an oxazolidine corresponding to the formula

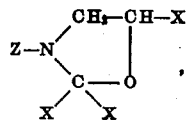

in which Z denotes hydrogen, alkyl, cycloalkyl or aryl radicles and X denotes hydrogen or an alkyl radicle, in the presence of an acid capable of liberating hydrocyanic acid from said salt.

3. The process for the manufacture of nitriles, which comprises reacting an aliphatic carbonyl compound selected from the group consisting of aliphatic aldehydes and ketones on an alkylolamine containing at least one hydrogen atom connected to a nitrogen atom, thereby forming a reaction product containing an oxazolidine corresponding to the formula

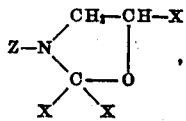

in which Z denotes hydrogen, alkyl, cycloalkyl or aryl radicles and X denotes hydrogen or an alkyl radicle, and reacting on said reaction product with hydrocyanic acid.

4. The process for the manufacture of nitriles, which comprises reacting an aliphatic carbonyl compound selected from the group consisting of aliphatic aldehydes and ketones on an alkylolamine containing at least one hydrogen atom connected to a nitrogen atom, thereby forming a reaction product containing an oxazolidine corresponding to the formula

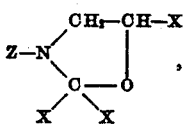

in which Z denotes hydrogen, alkyl, cycloalkyl or aryl radicles and X denotes hydrogen or an alkyl radicle, and reacting on said reaction product with a hydrocyanic acid salt in the presence of an acid capable of liberating hydrocyanic acid from said salt.

5. The process for the manufacture of nitriles, which comprises reacting hydrocyanic acid on an N-hydroxyalkyl oxazolidine corresponding to the formula

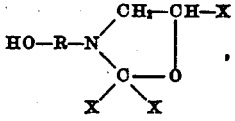

in which R denotes an aliphatic hydrocarbon radicle and X denotes hydrogen or an alkyl radicle.

6. The process for the manufacture of nitriles, which comprises reacting hydrocyanic acid on an oxazolidine corresponding to the formula

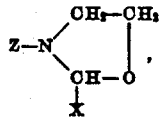

in which Z denotes hydrogen or an alkyl or cycloalkyl radicle and X denotes hydrogen or an aliphatic hydrocarbon radicle.

7. The process for the manufacture of nitriles, which comprises reacting hydrocyanic acid on an oxazolidine corresponding to the formula

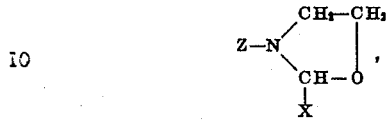

in which Z denotes hydrogen or an alkyl or alkylol radicle and X denotes hydrogen or an aliphatic hydrocarbon radicle.

8. The process for the manufacture of nitriles, which comprises reacting hydrocyanic acid on an oxazolidine corresponding to the formula

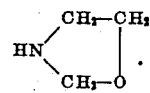

9. The process for the manufacture of nitriles, which comprises reacting an aliphatic aldehyde on an ethanol amine containing at least one hydrogen atom connected to the nitrogen atom, thereby forming an oxazolidine and reacting thereon with hydrocyanic acid.

10. Hydroxyalkyl-amino aceto nitriles.
11. Hydroxyethyl-amino aceto nitrile.
12. Di-(hydroxyethyl)amino aceto nitrile.

HEINRICH ULRICH.
KARL SAURWEIN.